United States Patent
Urata

(10) Patent No.: US 12,305,016 B2
(45) Date of Patent: May 20, 2025

(54) CONDUCTIVE RUBBER COMPOSITION FOR SENSING

(71) Applicant: BRIDGESTONE CORPORATION, Tokyo (JP)

(72) Inventor: Tomohiro Urata, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/292,166

(22) PCT Filed: May 26, 2022

(86) PCT No.: PCT/JP2022/021632
§ 371 (c)(1),
(2) Date: Jan. 25, 2024

(87) PCT Pub. No.: WO2023/026620
PCT Pub. Date: Mar. 2, 2023

(65) Prior Publication Data
US 2024/0336762 A1    Oct. 10, 2024

(30) Foreign Application Priority Data
Aug. 25, 2021    (JP) .................. 2021-137538

(51) Int. Cl.
*C08K 3/04*    (2006.01)
*F15B 15/10*    (2006.01)

(52) U.S. Cl.
CPC ................ *C08K 3/04* (2013.01); *C08K 3/041* (2017.05); *C08K 2201/001* (2013.01); *F15B 15/103* (2013.01)

(58) Field of Classification Search
CPC .... C08K 3/04; C08K 3/041; C08K 2201/001; C08K 2201/006; F15B 15/103; H01B 1/24
See application file for complete search history.

(56) References Cited

U.S. PATENT DOCUMENTS 4,765,930 A * 8/1988 Mashimo ............... C08K 3/04
                                               252/502
2017/0168415 A1 * 6/2017 Kuroda ............. G03G 15/0808

FOREIGN PATENT DOCUMENTS

EP    3 805 307 A1    4/2021
EP    3 805 307 B1    9/2023
(Continued)

OTHER PUBLICATIONS

International Preliminary Report on Patentability dated Feb. 27, 2024 with a Translation of the Written Opinion of the International Searching Authority in Application No. PCT/JP2022/021632.
(Continued)

*Primary Examiner* — Mark Kopec
*Assistant Examiner* — Jaison P Thomas
(74) *Attorney, Agent, or Firm* — Sughrue Mion, PLLC

(57) ABSTRACT

The technical problem of the present disclosure is to provide a conductive rubber composition for sensing that has good responsiveness of changes in electrical resistance to strain and can accurately detect the occurrence of cracks. The solution is a conductive rubber composition for sensing, containing a rubber component and carbon black, wherein the rubber component contains 80% by mass or more of acrylonitrile-butadiene rubber with an acrylonitrile unit content of more than 45% by mass, a loss tangent (tan δ) at 1% strain is 0.6 or less, and a hysteresis loss (Wd/Ws) at 70% elongation is 0.43 or more.

15 Claims, 6 Drawing Sheets

(56) References Cited

FOREIGN PATENT DOCUMENTS

| | | |
|---|---|---|
| JP | 2008-037906 A | 2/2008 |
| JP | 2022-029842 A | 2/2022 |
| JP | 2023-031809 A | 3/2023 |
| WO | 2019/230350 A1 | 5/2019 |

OTHER PUBLICATIONS

International Search Report for PCT/JP2022/021632, dated Jul. 26, 2022.
Extended European Search Report dated Jan. 3, 2025 in Application No. 22860916.0.

\* cited by examiner

CONDUCTIVE RUBBER COMPOSITION FOR SENSING

CROSS REFERENCE TO RELATED APPLICATIONS

This application is a National Stage of International Application No. PCT/JP2022/021632 filed May 26, 2022, claiming priority based on Japanese Patent Application No. 2021-137538 filed Aug. 25, 2021.

TECHNICAL FIELD

This disclosure relates to a conductive rubber composition for sensing.

BACKGROUND

A rubber actuator (which is so-called "Mckibben type") comprising a rubber tube that expands and contracts using a working fluid and a sleeve (mesh reinforcement structure) that covers the outer surface of the rubber tube has been known. For rubber products that repeatedly deform, such as the rubber tube of the rubber actuator, it is possible to measure the amount of deformation of the rubber member from the electrical resistance of the rubber member (Patent Document 1 below).

CITATION LIST

Patent Literature

PTL 1: JP 2008-037906 A

SUMMARY

Technical Problem

According to the art described in the above Patent Document 1, the amount of deformation of the rubber member can be determined by measuring the electrical resistance of the rubber member. However, it is not possible to detect the presence or absence of cracks in the rubber member. For rubber actuators that are filled with oil or other liquids, early detection of cracks in the rubber tube is important because cracks in the rubber tube may cause the tube to rupture or render the rubber actuator unusable.

The inventors examined the electrical resistance of the rubber tube during one cycle of expansion and contraction of the rubber actuator and immediately monitored the electrical resistance of the rubber tube during expansion and contraction, and found that the waveform of electrical resistance of one cycle before cracking, at the initial stage of cracking, and in the advanced state of cracking changed due to strain caused by the cracking (FIG. 1). However, with general conductive rubber, it is difficult to capture the changes in the waveform of electrical resistance due to strain caused by such cracks, and it is difficult to confirm the early stages of crack initiation by monitoring the electrical resistance alone. Accordingly, the use of conductive rubber composition for sensing with good responsiveness of changes in the electrical resistance to strain makes it possible to detect the occurrence of cracks with high accuracy.

Therefore, the present disclosure is to solve the technical problems of the aforementioned prior art, and to provide a conductive rubber composition for sensing that has good responsiveness of changes in electrical resistance to strain and can accurately detect the occurrence of cracks.

Solution to Problem

The gist of the conductive rubber composition for sensing in accordance with the present disclosure to solve the above technical problems is as follows.

[1] A conductive rubber composition for sensing, containing a rubber component and carbon black,
wherein the rubber component contains 80% by mass or more of acrylonitrile-butadiene rubber with an acrylonitrile unit content of more than 45% by mass,
a loss tangent (tan δ) at 1% strain is 0.6 or less, and
a hysteresis loss (Wd/Ws) at 70% elongation is 0.43 or more.

[2] The conductive rubber composition for sensing according to [1], wherein the loss tangent (tan δ) at 1% strain is 0.58 or less.

[3] The conductive rubber composition for sensing according to [1] or [2], wherein the hysteresis loss (Wd/Ws) at 70% elongation is 0.45 or more.

[4] The conductive rubber composition for sensing according to any one of [1] to [3], wherein the rubber component consists solely of the acrylonitrile-butadiene rubber with an acrylonitrile unit content of more than 45% by mass.

[5] The conductive rubber composition for sensing according to any one of [1] to [4], wherein the carbon black content is 40 parts by mass or more and 55 parts by mass or less per 100 parts by mass of the rubber component.

[6] The conductive rubber composition for sensing according to any one of [1] to [5], wherein the carbon black has a cetyltrimethylammonium bromide (CTAB) adsorption specific surface area of 110 $m^2/g$ or more.

[7] The conductive rubber composition for sensing according to any one of [1] to [6], further containing a carbon nanotube,
wherein the carbon nanotube content is 1 part by mass or more and 5 parts by mass or less per 100 parts by mass of the rubber component.

Advantageous Effect

According to the present disclosure, it is possible to provide a conductive rubber composition for sensing that has good responsiveness of changes in electrical resistance to strain and can accurately detect the occurrence of cracks.

DETAILED DESCRIPTION

Figure 1:
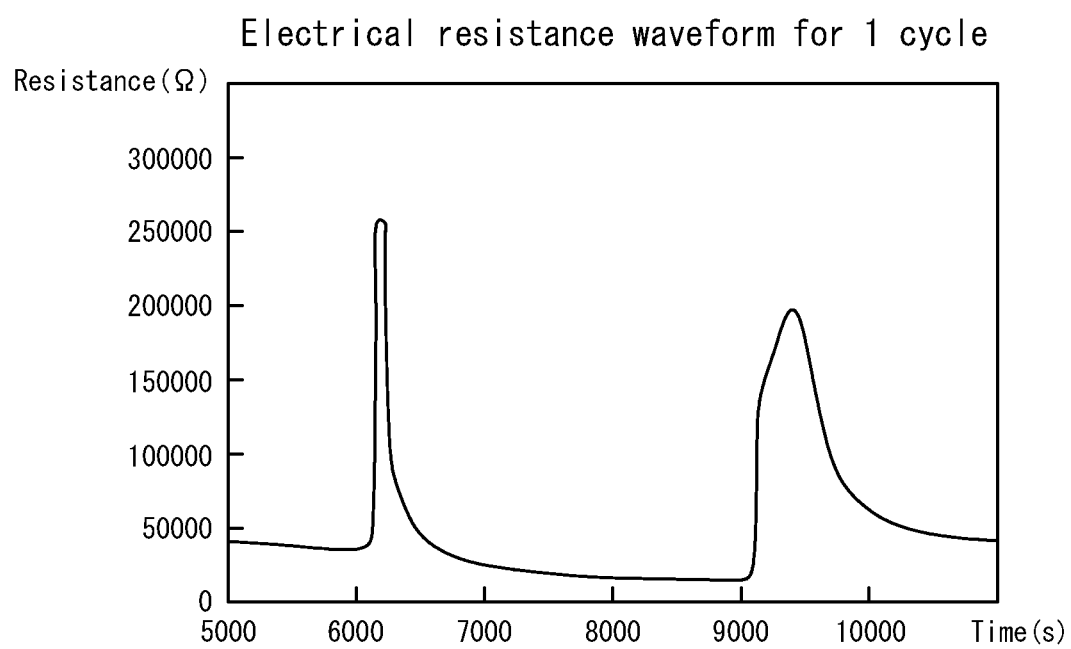
FIG. 1 provides the waveform of electrical resistance for one cycle with respect to an example rubber actuator.

The following is a detailed illustration of the conductive rubber composition for sensing of this disclosure, based on the embodiments thereof.

<Conductive Rubber Composition for Sensing>

The conductive rubber composition for sensing of this disclosure includes a rubber component and carbon black. Here, the conductive rubber composition for sensing of this disclosure is characterized in that the rubber component contains 80% by mass or more of acrylonitrile-butadiene rubber with an acrylonitrile unit content of more than 45% by mass, a loss tangent (tan δ) at 1% strain is 0.6 or less, and a hysteresis loss (Wd/Ws) at 70% elongation is 0.43 or more.

The loss tangent (tan δ) at 1% strain is an indicator of low strain loss and is related to the amount of friction between carbon blacks at low strain. On the other hand, the hysteresis loss (Wd/Ws) at 70% elongation is an indicator of high strain loss and is related to the amount of friction between carbon blacks at high strain. Therefore, when the amount of friction between carbon blacks is smaller at low strain and the amount of friction between carbon blacks is larger at high strain, the change in electrical resistance due to expansion and contraction during use (high strain) becomes large, and the responsiveness of changes in electrical resistance to strain becomes better. In this disclosure, when 80% by mass or more of the rubber component consists of acrylonitrile-butadiene rubber with an acrylonitrile unit content of more than 45% by mass, in a range where the loss tangent (tan δ) at 1% strain is 0.6 or less and the hysteresis loss (Wd/Ws) at 70% elongation is 0.43 or more, the electrical resistance changes reproducibly when strain is applied, and the electrical resistance returns reversibly when the strain is removed. This is thought to improve the responsiveness of changes in electrical resistance to strain.

As described above, the conductive rubber composition for sensing of this disclosure has better responsiveness of changes in electrical resistance to strain. Therefore, by combining the conductive rubber composition for sensing of this disclosure with AI learning that uses electrical resistance as an input, it is possible to detect the occurrence of cracks from the dynamic behavior of changes in electrical resistance (AI sensing).

In addition, in the conductive rubber composition for sensing of this disclosure, 80% by mass or more of the rubber component consists of acrylonitrile-butadiene rubber with an acrylonitrile unit content of more than 45% by mass, and the acrylonitrile-butadiene rubber with an acrylonitrile unit content of more than 45% by mass has high oil resistance. Therefore, the conductive rubber composition for sensing of this disclosure has high oil resistance and is suitable for applications where oil resistance is required, e.g., rubber tubes for rubber actuators.

(tan δ)

The conductive rubber composition for sensing of this disclosure has a loss tangent (tan δ) at 1% strain of 0.6 or less, and preferably of 0.58 or less. When the loss tangent (tan δ) at 1% strain exceeds 0.6, the amount of friction between carbon blacks at low strain is large and the responsiveness of changes in electrical resistance to strain is insufficient. On the other hand, when the loss tangent (tan δ) at 1% strain is 0.58 or less, the amount of friction between carbon blacks at low strain is further reduced and the responsiveness of changes in electrical resistance to strain is improved. In addition, from the viewpoint of ease of making rubber compositions with a Wd/Ws at 70% elongation of 0.43 or more, the loss tangent (tan δ) at 1% strain is preferably 0.15 or more.

In the present disclosure, the loss tangent (tan δ) at 1% strain is measured by the method described in the Examples.

(Wd/Ws)

The conductive rubber composition for sensing of this disclosure has a hysteresis loss (Wd/Ws) at 70% elongation of 0.43 or more, and preferably of 0.45 or more. When the hysteresis loss (Wd/Ws) at 70% elongation is less than 0.43, the amount of friction between carbon blacks at high strain is small and the responsiveness of changes in electrical resistance to strain is insufficient. On the other hand, when the hysteresis loss (Wd/Ws) at 70% elongation is 0.45 or more, the amount of friction between carbon blacks at high strain is further increased and the responsiveness of changes in electrical resistance to strain is improved. In addition, from the viewpoint of ease of manufacturing the rubber composition with a tan δ at 1% strain of 0.6 or less, the hysteresis loss (Wd/Ws) at 70% elongation is preferably 0.6 or less.

In the present disclosure, the hysteresis loss (Wd/Ws) at 70% elongation is measured by the method described in the Examples.

The loss tangent (tan δ) at 1% strain and the hysteresis loss (Wd/Ws) at 70% elongation of the conductive rubber composition for sensing mentioned above can be adjusted by selecting the appropriate amount and properties of carbon black used in the rubber composition.

(Rubber Component)

The conductive rubber composition for sensing of this disclosure contains a rubber component, which provides rubber elasticity to the composition and allows the rubber composition to expand and contract.

The rubber component of the conductive rubber composition for sensing of this disclosure contains 80% by mass or more of, preferably contains 90% by mass or more of, acrylonitrile-butadiene rubber (NBR) with an acrylonitrile unit content of more than 45% by mass. In addition, the rubber component preferably consists solely of the acrylonitrile-butadiene rubber with an acrylonitrile unit content of more than 45% by mass. The acrylonitrile-butadiene rubber with an acrylonitrile unit content of more than 45% by mass has excellent oil resistance, and therefore, the conductive rubber composition for sensing of this disclosure, in which 80% by mass or more of the rubber component consists of acrylonitrile-butadiene rubber with an acrylonitrile unit content of more than 45% by mass, has high oil resistance and is suitable for applications requiring oil resistance, e.g., rubber tubes for rubber actuators. Furthermore, when the rubber component consists solely of the acrylonitrile-butadiene rubber with an acrylonitrile unit content of more than 45% by mass, oil resistance is further improved.

The acrylonitrile unit content of the acrylonitrile-butadiene rubber (NBR) is more than 45% by mass, and when it exceeds 45% by mass, it is preferable from the viewpoint of oil resistance. The acrylonitrile unit content of the acrylonitrile-butadiene rubber (NBR) is preferably 50% by mass or less in terms of fatigue resistance and crack extension resistance.

The acrylonitrile unit content (bound acrylonitrile content) of the acrylonitrile-butadiene rubber (NBR) can be measured by the Kjeldahl method according to JIS K6384.

The rubber component may further contain other rubber components. As such other rubber components, various rubber components that provide rubber elasticity to the composition can be utilized. The other rubber components include acrylonitrile-butadiene rubber (NBR) with an acrylonitrile unit content of 45% by mass or less, natural rubber (NR), synthetic isoprene rubber (IR), butadiene rubber (BR), styrene-butadiene rubber (SBR), chloroprene rubber (CR), etc. The number of rubber components used may be one or two or more.

(Carbon Black)

The conductive rubber composition for sensing of this disclosure contains carbon black, which provides conductivity to the composition and enables sensing of the rubber composition.

The carbon black content is preferably 40 parts by mass or more and 55 parts by mass or less per 100 parts by mass of the rubber component. When the carbon black content is 40 parts by mass or more per 100 parts by mass of the rubber component, the electrical resistance of the rubber composition becomes sufficiently low (electricity flows sufficiently) and changes in electrical resistance are even easier to detect. When the carbon black content is 55 parts by mass or less per 100 parts by mass of the rubber component, the electrical resistance of the rubber composition becomes sufficiently high (electricity does not flow too much) and changes in electrical resistance are further easier to detect, and also, the hardness of the rubber composition becomes lower and which makes it suitable for application to, for example, rubber tubes in rubber actuators.

Note that when the electrical resistance is sufficiently high, the electrical resistance changes when the rubber is strained because electricity does not flow too much, and the electrical resistance changes immediately without any delay, making it suitable for use in crack detection. Also, when the electrical resistance is sufficiently low, electricity will flow and energize sufficiently, making it suitable for use in crack detection. In addition, when the carbon black content is 40 parts by mass or more and 55 parts by mass or less per 100 parts by mass of the rubber component, it is possible to detect changes in electrical resistance due to strain without delay and with high sensitivity.

The carbon black preferably has a cetyltrimethylammonium bromide (CTAB) adsorption specific surface area of 110 $m^2/g$ or more. When the CTAB adsorption specific surface area of the carbon black is 110 $m^2/g$ or more, the particle size of the carbon black is sufficiently small and the electrical resistance is sufficiently low, making it even easier to detect the changes in electrical resistance and further improving responsiveness.

The cetyltrimethylammonium bromide (CTAB) adsorption specific surface area of the carbon black is further preferred to be 120 $m^2/g$ or more from the viewpoint of further facilitating detection of changes in electrical resistance, and is preferred to be 160 $m^2/g$ or less from the viewpoint of workability.

Note that in this document, the cetyltrimethylammonium bromide (CTAB) adsorption specific surface area of carbon black is a value measured in accordance with JIS K6217-3, and is the external surface area of carbon black, not including micropores, expressed as the specific surface area of carbon black adsorbed with CTAB (cetyltrimethylammonium bromide).

The compressed dibutyl phthalate (24M4DBP) absorption amount of carbon black is preferably 90 mL/100 g or more. The 24M4DBP absorption amount of carbon black is a physical property related to the structure of carbon black, and the higher the 24M4DBP absorption amount, the lower the electrical resistance of the rubber composition. In addition, the 24M4DBP absorption amount of carbon black is also an indicator of high strain loss and is related to the amount of friction between carbon blacks at high strain. At high strain, the greater the amount of friction between carbon blacks, the greater the change in electrical resistance due to expansion and contraction (high strain) during use, and the better the responsiveness of changes in electrical resistance to strain. Therefore, when the 24M4DBP absorption amount of carbon black is 90 mL/100 g or more, the electrical resistance of the rubber composition is sufficiently low, and the responsiveness of changes in electrical resistance to strain is even better.

In addition, the compressed dibutyl phthalate (24M4DBP) absorption amount of carbon black is preferably 130 mL/100 g or less from the viewpoint of reducing variation due to kneading.

Note that in this document, the compressed dibutyl phthalate (24M4DBP) absorption amount of carbon black is determined by measuring dibutyl phthalate (DBP) absorption amount after four repeated applications of pressure at 24,000 psi, in accordance with ISO 6894. The 24M4DBP absorption amount is used to determine the DBP absorption amount based on the true structure of non-destructive structure form (primary structure), eliminating the DBP absorption amount based on the deformable and destructive structure form (secondary structure) caused by the so-called van der Waals forces. Thus, it is an index to evaluate the skeletal structure of carbon black, which is mainly composed of primary structure.

The carbon black is not limited as long as it meets the above conditions, and includes, for example, GPF, FEF, HAF, ISAF, and SAF grade carbon blacks. These carbon blacks may be used alone or in combination of two or more.

(Carbon Nanotube)

The conductive rubber composition for sensing of this disclosure preferably further contains a carbon nanotube. The carbon nanotube acts to improve the conductivity of the composition.

The carbon nanotube content is preferably 1 part by mass or more and 5 parts by mass or less, and more preferably 2 parts by mass or more and 5 parts by mass or less per 100 parts by mass of the rubber component. When the carbon nanotube content is 1 part by mass or more per 100 parts by mass of the rubber component, the electrical resistance of the rubber composition becomes sufficiently low (electricity flows sufficiently), and the change in electrical resistance is even easier to detect. Also, when the carbon nanotube content is 5 parts by mass or less per 100 parts by mass of the rubber component, the electrical resistance of the rubber composition becomes sufficiently high (electricity does not flow too much), and the change in electrical resistance is even easier to detect. Therefore, when the carbon nanotube content is in the range of 1 part by mass or more to 5 parts by mass or less per 100 parts by mass of the rubber component, the change in electrical resistance is even easier to detect, and thus the responsiveness is further improved.

The carbon nanotube (CNT) is a structure composed of carbon atoms ranging from several nm to several tens of nm in diameter, and have an extremely fine tube-like structure.

The carbon nanotube can be a single-walled nanotube or a multi-walled nanotube.

The carbon nanotube is preferably 0.1 μm to 30 μm in length, and more preferably 0.1 μm to 10 μm in length.

Also, the carbon nanotube is preferably 10 nm to 300 nm in diameter, and more preferably 100 nm to 250 nm in diameter.

The carbon nanotube can be synthesized by plasma CVD (chemical vapor deposition), thermal CVD, surface decomposition, fluidized vapor synthesis, arc discharge, or other methods, or commercial products can also be used. For example, carbon nanotubes made by KUMHO, vapor grown carbon fibers VGCF® (registered trademark) made by Showa Denko, and carbon nanotubes made by Materials Technologies Research (MTR) in USA, can be used as commercially available carbon nanotubes.

<Production Method for Conductive Rubber Composition for Sensing>

The rubber composition of this disclosure can be produced, for example, by compounding the rubber component with carbon black and further compounding with a carbon nanotube(s) if desired, using a Banbury mixer, rolls, etc., and then kneading, warming, and extruding, etc.

In addition to the ingredients mentioned above, the conductive rubber composition for sensing may contain softening agents, stearic acid, antioxidants, zinc oxide (zinc white), vulcanization accelerators, vulcanizing agents, etc., selected as appropriate to the extent not detrimental to the purpose of this disclosure. Commercial products can be suitably used as these compounding agents.

<Applications of Conductive Rubber Composition for Sensing>

The conductive rubber composition for sensing of this disclosure described above can be used for sensing (perceiving, detecting, monitoring, apprehending) the amount of strain because of its good responsiveness of changes in electrical resistance to strain. The conductive rubber composition for sensing can be used for various rubber products, and is especially suitable for rubber tubes for rubber actuators. In addition to rubber actuators, the conductive rubber composition for sensing of this disclosure can be converted to any rubber member that generates strain when used, such as tires, anti-vibration rubber, isolation rubber, conveyor belts, crawlers, gloves, etc., as appropriate, and it goes without saying that the applications are not limited to the above examples but can be applied in a wide range.

(Rubber Actuator)

Figure 2:
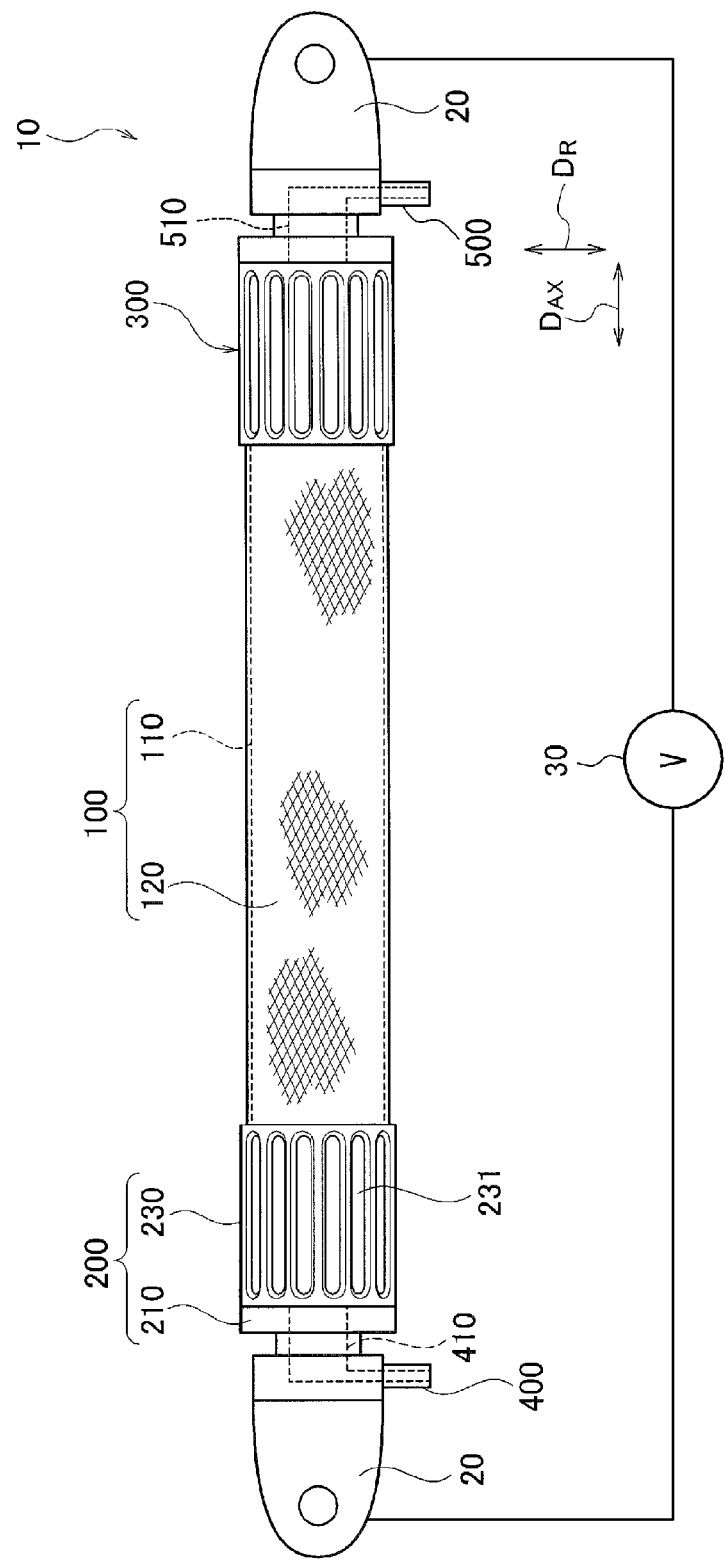
FIG. 2 is a side view of an example rubber actuator.

A rubber actuator in a suitable embodiment using the conductive rubber composition for sensing of this disclosure is illustrated in FIG. 2. The rubber actuator 10 illustrated in FIG. 2 comprises an actuator body 100 composed of a tubular rubber tube 110 that expands and contracts due to fluid pressure, and a sleeve 120 that covers the outer surface of the rubber tube 110 with a tubular structure of braided cords oriented in a predetermined direction. The conductive rubber composition for sensing of this disclosure as described above is used in the rubber tube 110.

FIG. 2 is a side view of the rubber actuator 10 according to this embodiment. As illustrated in FIG. 2, the rubber actuator 10 comprises an actuator body 100, a sealing mechanism 200, and a sealing mechanism 300. The rubber actuator 10 is provided with a connecting part 20 at each end. A resistance measuring device 30 is connected to each connecting part 20.

The actuator body 100 is composed of a rubber tube 110 and a sleeve 120. A working fluid flows into the actuator body 100 through a fitting 400 and a passage hole 410. Here, the rubber actuator 10 is actuated by fluid pressure and may be pneumatic or hydraulic, and when a liquid is used as the working fluid, the liquid may be oil, water, etc. When the rubber actuator is a hydraulic type, hydraulic fluid conventionally used in hydraulic drive systems can be used as the working fluid.

The actuator body 100 contracts in the axial direction $D_{AX}$ and expands in the radial direction $D_R$ of the actuator body 100 as the working fluid flows into the rubber tube 110. Also, the actuator body 100 expands in the axial direction $D_{AX}$ and contracts in the radial direction $D_R$ of the actuator body 100 as the working fluid flows out of the rubber tube 110. This change in the shape of the actuator body 100 allows the rubber actuator 10 to function as an actuator.

Such a rubber actuator 10 is a so-called Mckibben type and can be applied for artificial muscles, as well as for body limbs of robots (upper limbs, lower limbs, etc.) that require higher capacity (contractile force). The members constituting the body limb and the like are connected to the connecting parts 20. In this embodiment, the resistance measuring device 30 is connected to the connecting parts 20, but the connecting point of the resistance measuring device 30 is not limited to this, and, for example, the device may be directly connected to both ends of the rubber tube 110.

The sealing mechanism 200 and the sealing mechanism 300 seal both ends of the actuator body 100 in the axial direction $D_{AX}$. Specifically, the sealing mechanism 200 includes a sealing member 210 and a caulking member 230. The sealing member 210 seals the end in the axial direction $D_{AX}$ of the actuator body 100. The caulking member 230 caulks the actuator body 100 together with the sealing member 210. An indentation 231 is formed on the outer circumference of the caulking member 230, which is the mark where the caulking member 230 was caulked by the jig.

The difference between the sealing mechanism 200 and the sealing mechanism 300 is that the roles of fittings 400, 500 (and passage holes 410, 510) are different.

The fitting 400 provided in the sealing mechanism 200 protrudes so that a hose (conduit) connected to the drive pressure source of the rubber actuator 10, specifically, the compressor of the working fluid, can be attached. The working fluid that flows through the fitting 400 passes through the passage hole 410 and into the interior of the actuator body 100, specifically, the rubber tube 110.

On the other hand, the fitting 500 provided in the sealing mechanism 300 protrudes so that it can be used as a vent when injecting the working fluid into the rubber actuator 10. When the working fluid is injected into the rubber actuator 10 in the early stages of operation of the rubber actuator 10, the gas originally present inside the rubber actuator 10 is expelled from the fitting 500 through the passage hole 510.

Figure 3:
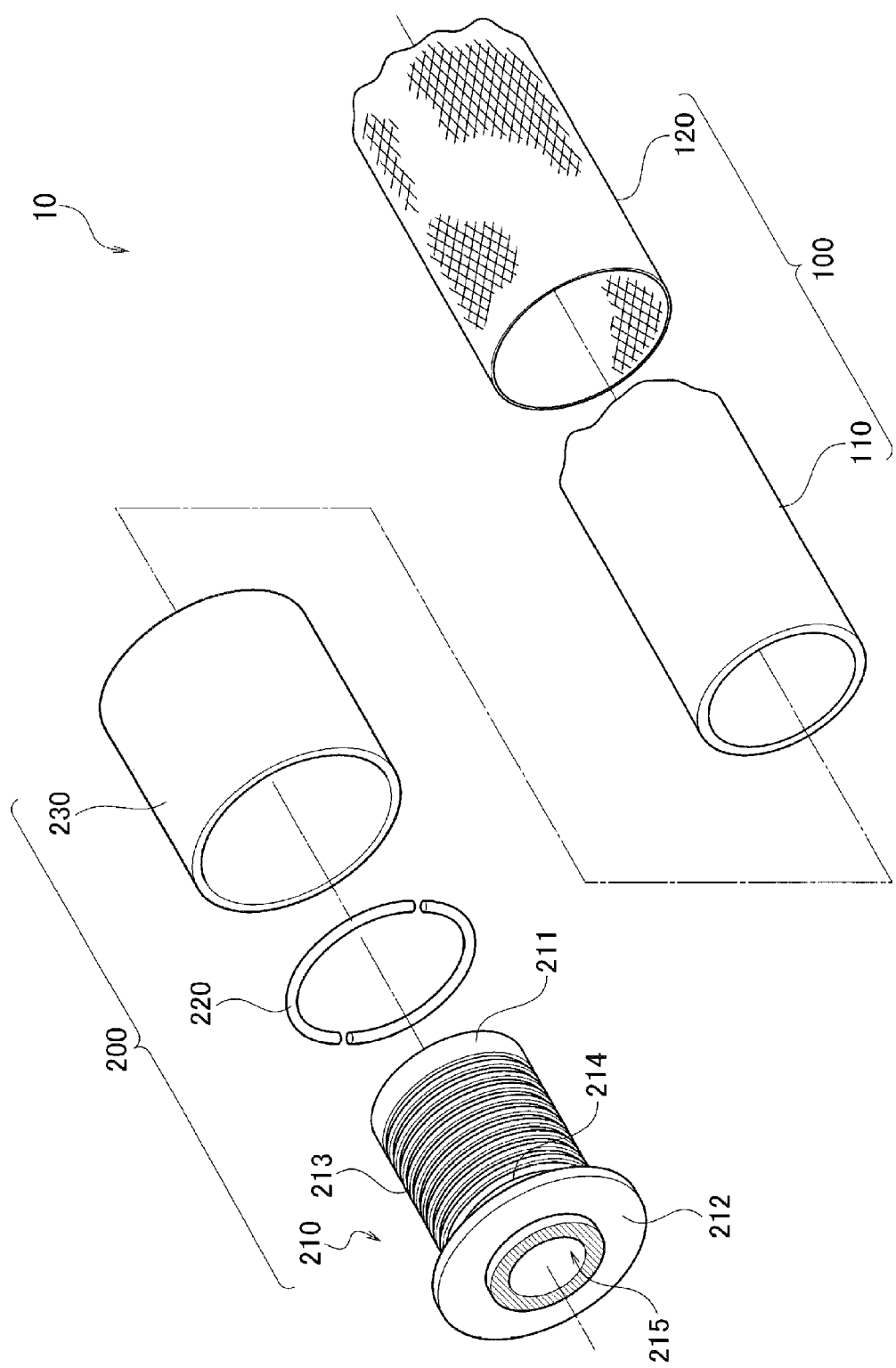
FIG. 3 is a partially exploded perspective view of an example rubber actuator.

FIG. 3 is a partially exploded perspective view of the rubber actuator 10. As illustrated in FIG. 3, the rubber actuator 10 comprises an actuator body 100 and a sealing mechanism 200.

The actuator body 100 is composed of a rubber tube 110 and a sleeve 120, as described above.

The rubber tube 110 is a cylindrical tubular body that expands and contracts due to fluid pressure. The rubber tube 110 repeatedly contracts and expands due to the working fluid, and is applied with the conductive rubber composition for sensing of this disclosure as described above.

The sleeve 120 is cylindrical and covers the outer surface of the rubber tube 110. The sleeve 120 is a structure of braided cords oriented in a predetermined direction, and the oriented cords intersect to form a repeated rhombus shape. The sleeve 120, by having this shape, pantographically deforms and follows the rubber tube 110 while regulating its contraction and expansion.

In FIG. 3, the sealing mechanism 200 seals the end of the actuator body 100 in the axial direction $D_{AX}$. The sealing mechanism 200 is composed of a sealing member 210, a locking ring 220, and a caulking member 230.

The sealing member 210 has a trunk part 211 and a brim part 212. A metal such as stainless steel can be suitably used as the sealing member 210, but it is not limited to such metals, and a hard plastic material or the like can also be used.

The trunk part 211 has a circular tubular shape, and a passage hole 215 through which the working fluid passes are formed in the trunk part 211. The passage hole 215 is connected to the passage hole 410 (see FIG. 2). The rubber tube 110 is inserted onto the trunk part 211.

The brim part 212 is connected to the trunk part 211 and is located on the end side in the axial direction $D_{AX}$ of the actuator 10 than the trunk part 211. The brim part 212 has a larger outer diameter along the radial direction $D_R$ than the trunk part 211. The brim part 212 secures the rubber tube 110 and the locking ring 220 inserted onto the trunk part 211.

The outer surface of the trunk part 211 is formed with a concavo-convex part 213. The concavo-convex part 213 contributes to the slip control of the rubber tube 110 inserted onto the trunk part 211. It is preferable that three or more convex parts are formed by the concavo-convex part 213.

In addition, at a position closer to the brim part 212 of the trunk part 211, a small diameter part 214 is formed, which has a smaller outer diameter than the trunk part 211.

The locking ring 220 engages the sleeve 120. Specifically, the sleeve 120 is folded outwardly in the radial direction $D_R$ through the locking ring 220.

The outer diameter of the locking ring 220 is larger than the outer diameter of the trunk part 211. The locking ring 220 locks the sleeve 120 at the position of the small diameter part 214 of the trunk part 211. In other words, the locking ring 220 locks the sleeve 120 at the position, outward in the radial direction $D_R$ of the trunk part 211 and adjacent to the brim part 212.

The locking ring 220 is shaped in two parts in this embodiment in order to be locked to the small diameter part 214, which is smaller than the trunk part 211. The locking ring 220 is not limited to be configured in two parts, but may be divided into more parts, or some of the divided parts may be rotatably connected.

The locking ring 220 can be made of the same metal or hard plastic material as the sealing member 210.

The caulking member 230 caulks the actuator body part 100 together with the sealing member 210. Metals such as aluminum alloy, brass and iron can be used as the caulking member 230. When the caulking member 230 is caulked by a caulking jig, an indentation 231 is formed on the caulking member 230, as illustrated in FIG. 2.

Figure 4:
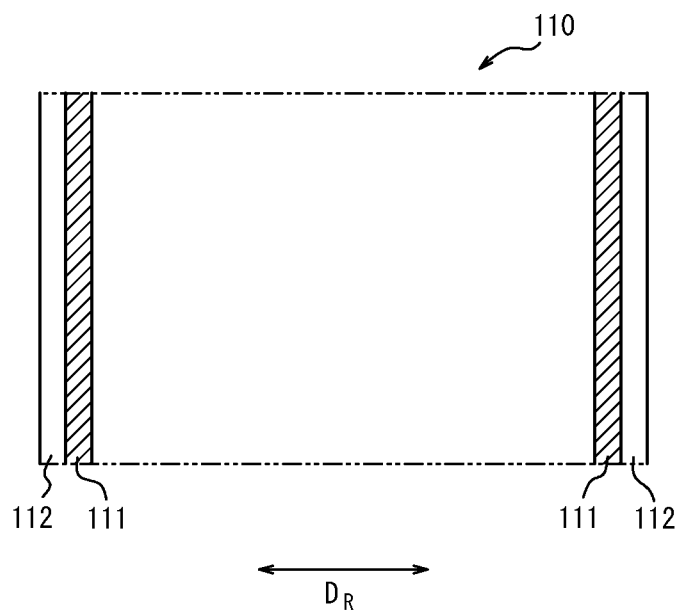
FIG. 4 is a partial cross-sectional view of an example rubber tube.

FIG. 4 is a partial cross-sectional view of the rubber tube 110 according to one embodiment.

The rubber tube 110 illustrated in FIG. 4 has a two-layer structure consisting of an inner layer rubber 111 located on the inner surface side of the rubber tube and an outer layer rubber 112 located on the outer surface side of the rubber tube 110, adjacent to the outer side in the radial direction $D_R$ of the inner layer rubber 111.

The conductive rubber composition for sensing of this disclosure described above has excellent oil resistance, therefore can be applied to the inner layer rubber 111 that is in contact with the working fluid. If the oil resistance of the inner layer rubber 111 is insufficient, the working fluid may penetrate to the space between the inner layer rubber 111 and the outer layer rubber 112, which may reduce the durability of the rubber tube 110. However, by applying the conductive rubber composition for sensing of this disclosure as described above to the inner layer rubber 111, cracks in the inner layer rubber 111 can be detected at an early stage, and by preventing the ingress of working fluid and replacing the rubber tube 110 at the appropriate time, the rubber actuator can be prevented from stopping functioning.

On the other hand, since the outer layer rubber 112 is in contact with the sleeve 120, it is preferable to apply a rubber composition that has excellent crack resistance, wear resistance, sliding properties, etc., and can withstand loads from the sleeve 120 side.

Note that the rubber tube 110 is not limited to be configured in a two-layer structure, but may have a single-layer structure, or may have three or more layers. When the rubber tube 110 has a laminated structure of three or more layers, it is preferable to apply the conductive rubber composition for sensing of this disclosure as described above to the innermost layer.

As described above, the rubber tube 110 repeatedly contracts and expands due to the working fluid, and is applied with the conductive rubber composition for sensing of this disclosure.

Here, the higher the contraction rate of the actuator body 100, the lower the electrical resistance of the actuator body 100 (rubber tube 110). This is because when fluid flows into the actuator body 100 and the actuator body 100 contracts in the axial direction $D_{AX}$, the rubber tube 110 expands in the radial direction $D_R$ within a predetermined range regulated by the sleeve 120, and the thickness of the rubber tube 110 becomes thinner, thereby the distance between the carbon blacks (and carbon nanotubes) in the rubber tube 110 is shortened.

Specifically, when the actuator body 100 contracts, the rubber tube 110 expands, resulting in a thinner film thickness of the rubber tube 110. As a result, the dimensions (distance) of carbon blacks (and carbon nanotubes) in the film thickness direction are narrowed and carbon blacks (and carbon nanotubes) are brought closer together.

That is, as the contraction rate of the actuator body 100 increases and the length of the actuator body 100 decreases, the distance between the carbon blacks (and carbon nanotubes) is shortened, thereby the conductivity of the rubber tube 110 increases, in other words, the electrical resistance of the rubber tube 110 decreases.

The repetition of contraction and expansion due to the working fluid may cause cracks in the rubber tube 110. As provided in FIG. 1, the pattern of change in the electrical resistance is different at each stage of the process: no cracks, in the early stages of cracking, and with cracks. Therefore, the dynamic behavior of the change in electrical resistance caused by strain due to the occurrence of cracks in the rubber tube 110 can be analyzed using statistical methods or learned by an AI, so that the occurrence of cracks in the rubber tube 110 can be detected from the dynamic behavior of the change in electrical resistance.

EXAMPLES

The present disclosure is described in more detail below with examples, but this disclosure is not limited in any way to the following examples.

<Preparation of Rubber Composition>

Rubber compositions having the formulations provided in Table 1 were prepared by kneading them in a usual manner. The type, properties, and compounding amount of carbon black used, as well as the compounding amount of carbon nanotubes, are provided in Table 2.

TABLE 1

| Substance Name | Compounding Amount (parts by mass) |
| --- | --- |
| NBR *1 | 100 |
| Carbon black (CB) *2 | Variable |
| Carbon nanotube (CNT) *3 | Variable |
| Ester oil *4 | 7.5 |
| Hydrogenated fatty acid *5 | 1 |
| Antioxidant *6 | 1.5 |
| Zinc oxide *7 | 4.97 |
| Vulcanization accelerator A *8 | 0.5 |
| Vulcanization accelerator B *9 | 0.6 |
| Sulfur *10 | 0.6 |

*1 NBR: Acrylonitrile-butadiene rubber, acrylonitrile unit content = 48% by mass, product name "N215SL" made by JSR Corporation.
*2 Carbon black: The type, properties and compounding amount of carbon black used are provided in Table 2.
*3 Carbon nanotube: Product name "CNT K-Nanos-100P", made by Kumho, with the compounding amount provided in Table 2.
*4 Estel oil: Product name "TP-95", made by HallStar Company.
*5 Hydrogenated fatty acid: Product name "Stearic acid 50S", made by New Japan Chemical Co., LTD.
*6 Antioxidant: Polymerized 2,2,4-trimethyl-1,2-dihydroquinoline, Product name "NONFLEX RD", made by Seiko Chemical Co., LTD.
*7 Zinc oxide: Product name "Zinc Oxide Type 2 granulated product", made by Hakusui Tech Co., LTD.
*8 Vulcanization accelerator A: N-cyclohexyl-2-benzothiazolylsulfenamide, Product name "SANCELER CM-G", made by Sanshin Chemical Co.
*9 Vulcanization accelerator B: Tetrakis(2-ethylhexyl)thiuram disulfide, Product name "NOCCELER TOT", made by Ouchi Shinko Chemical Industrial Co., LTD.
*10 Surfer: Product name "HK200-5", made by Hosoi Chemical Industry, indicated in Table 1 as the amount of sulfur component.

<Testing with Vulcanized Rubber>

Rubber sheets of 1 mm thickness were prepared from the resulting rubber compositions and vulcanized them at 155° C. for 45 minutes to produce vulcanized rubber sheets. Strip-shaped test pieces of 4.7 mm×40 mm were prepared from the vulcanized rubber sheets. The loss tangent (tan δ) at 1% strain and the hysteresis loss (Wd/Ws) at 70% elongation were measured and the presence or absence of strain responsiveness was evaluated on the specimens by the following methods.

(1) tan δ

The tan δ values of the prepared specimens were measured using a spectrometer (made by Toyo Seiki Co., Ltd.) in accordance with JIS K 6394 at a test environment temperature of 30° C., distance between chucks of 10 mm, initial strain of 150 μm, dynamic strain of 1%, and frequency of 52 Hz.

(2) Wd/Es

Figure 5:
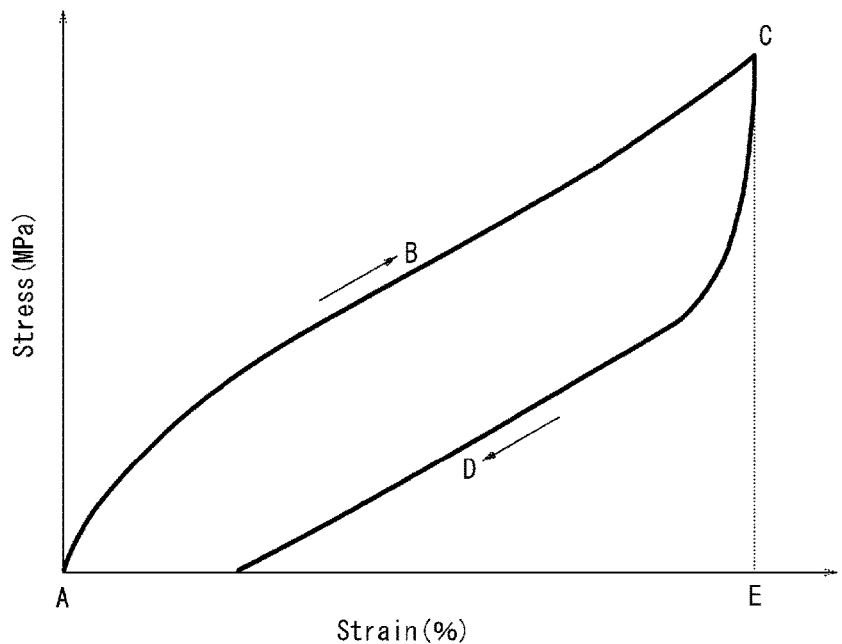
FIG. 5 explains the hysteresis loss (Wd/Ws) at 70% elongation.

The prepared test specimens were subjected to 70% elongation for 10 times using a tensile testing machine (K18003) made by System One at room temperature and a distance of 20 mm between chucks (10 repetitive cycles of 0% to 70% elongation to 0%), and then hysteresis loss [–] at a tensile speed of 6 mm/sec (Wd/Ws, energy lost/energy stored) was calculated. The hysteresis loss was calculated by the ratio (ABCDA/ABCEA) of the area corresponding to ABCDA to the area corresponding to ABCEA in the stress-strain curve diagram provided in FIG. 5.

(3) Strain Responsiveness Test

Dynamic electrical measurements were performed simultaneously with the above Wd/Ws measurements. The electrical resistance measurements were sampled at DC 10 V and 200 Hz. The electrical resistance values differ reproducibly due to strain, and the ratio of the signal value(S), which is the difference between the minimum and maximum electrical resistance values within the region of 10% elongation to 70% elongation to 10% elongation, to the standard deviation (n) of the electrical resistance values within the region of 0% to 10% elongation was evaluated using the following criteria to determine whether it is sufficient.

Figure 6:
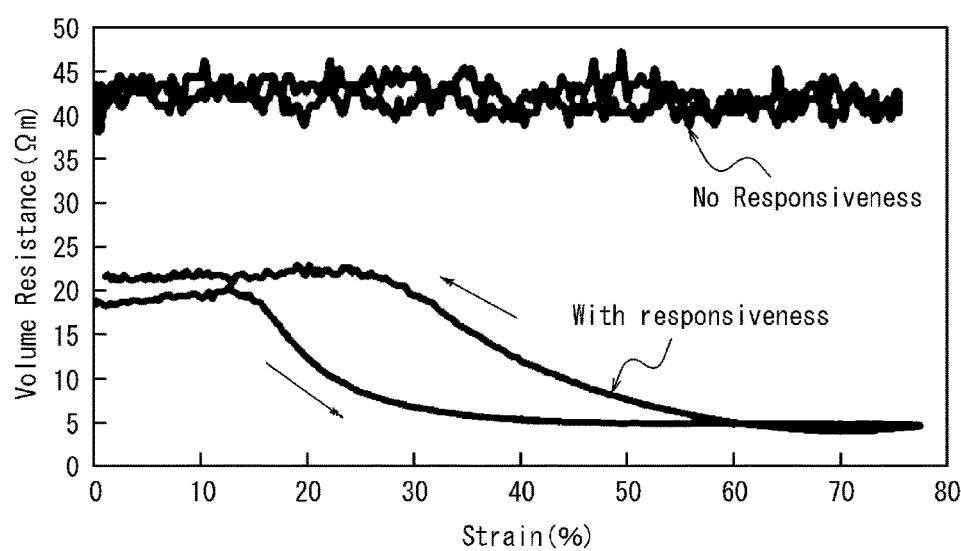
FIG. 6 provides examples of changes in electrical resistance with and without responsiveness, respectively.

S/n ratio is 9 or more, with strain responsiveness x: S/n ratio is less than 9, no strain responsiveness An example of the strain dependence of electrical resistance is provided in FIG. 6. As provided in FIG. 6, a rubber with a sufficiently large S/n ratio has a large change in electrical resistance due to strain, thus has strain responsiveness, while a rubber with a small S/n ratio has a small change in electrical resistance due to strain, thus has no strain responsiveness.

Figure 7:
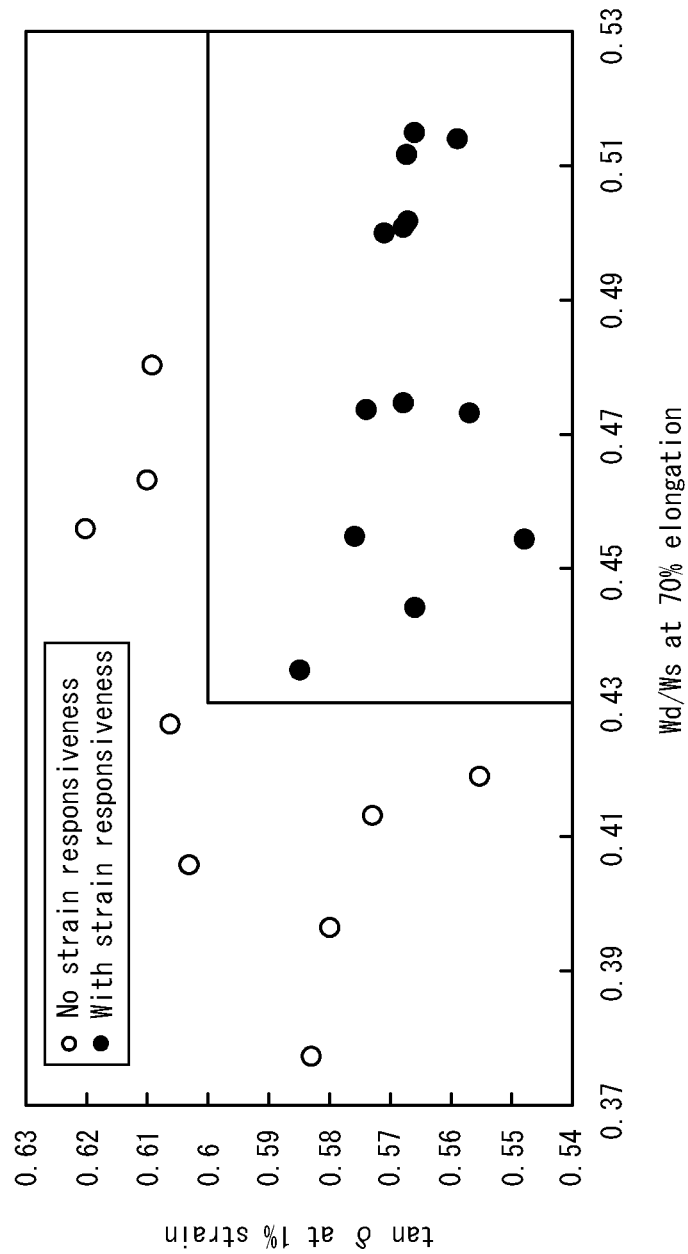
FIG. 7 provides the relationship between the loss tangent (tan δ) at 1% strain and the hysteresis loss (Wd/Ws) at 70% elongation for the rubber compositions of the Examples and Comparative Examples.

The results of the above tests are provided in Table 2 and FIG. 7.

<Testing with Rubber Actuators>

The rubber compositions of Examples 11 and 13, and Comparative Examples 8 and 9 were applied to the inner layer rubber of the two-layer rubber tube comprising the inner layer rubber and the outer layer rubber illustrated in FIG. 4 to produce cylindrical rubber tubes.

Two aramid fibers of 2200 dtex were used as the base yarn and were subjected to lower twist of 12 times/10 cm and another upper twist of 12 times/10 cm to produce an aramid fiber cord with a diameter of 0.7 mm. A mesh-like sleeve made by braiding 64 aramid fiber cords was prepared. The sleeve had a mesh-like tubular structure with 64 aramid fiber cords observed circumferentially in the transverse cross-section. Specifically, this sleeve had a mesh-like tubular structure consisting of 32 aramid fiber cords arranged in an equally spaced, parallel, spiral pattern, alternately braided with 32 other aramid fiber cords that are diagonally interlaced with these 32 aramid fiber cords and also arranged in an equally spaced, parallel, and spiral pattern. The angle of each cord with respect to the axial direction of the sleeve was 25 degrees.

The rubber actuators with the structure illustrated in FIGS. 2 and 3 were fabricated using the rubber tube and the mesh-like sleeve described above. The length between the sealing mechanism 200 and the sealing mechanism 300 was 250 mm. In addition, as the hydraulic oil for the rubber tube, UF46 made by Cosmo Super Epoch Co., Ltd. was used.

(4) Crack Detection Test

Hydraulic fluid was injected into the rubber tube to fully displace the air in the rubber tube with the hydraulic fluid. The injection of hydraulic fluid was performed so that the pressure of the hydraulic fluid in the rubber tube repeated 0 MPa and 5 MPa every 3 seconds, respectively, and the expansion and contraction were repeated until the tube cracked, the crack was extended, and the actuator could no longer perform its function.

At this time, we attempted to detect the occurrence of cracks by monitoring electrical resistance, and succeeded in detecting cracks using AI for the rubber actuators that use the rubber samples of Examples 11 and 13, which were evaluated as "with strain responsiveness", for the rubber tubes. On the other hand, occurrence of cracks could not be detected in the rubber actuators that use the rubber samples of Comparative Examples 8 and 9, which were evaluated as "no strain responsiveness", for the rubber tubes.

TABLE 2

| | Compounding Amount of Carbon Black (parts by mass) | | | | Physical Properties of Carbon Black | | Compounding Amount of Carbon | High-strain | Low-strain | |
|---|---|---|---|---|---|---|---|---|---|---|
| | CB1 *11 | CB2 *12 | CB3 *13 | CB4 *14 | CTAB (m²/g) | 24M4DBP (mL/100 g) | Nanotube (parts by mass) | Loss Wd/Ws | Loss tan δ | Strain Responsiveness |
| Example 1 | 55 | — | — | — | 112 | 100 | — | 0.444 | 0.566 | ○ |
| Example 2 | 60 | — | — | — | 112 | 100 | — | 0.475 | 0.568 | ○ |
| Example 3 | 65 | — | — | — | 112 | 100 | — | 0.501 | 0.568 | ○ |
| Example 4 | 70 | — | — | — | 112 | 100 | — | 0.515 | 0.566 | ○ |
| Example 5 | 40 | — | — | — | 112 | 100 | 2 | 0.455 | 0.548 | ○ |
| Example 6 | 45 | — | — | — | 112 | 100 | 2 | 0.473 | 0.557 | ○ |
| Example 7 | 55 | — | — | — | 112 | 100 | 2 | 0.514 | 0.559 | ○ |
| Example 8 | 60 | — | — | — | 112 | 100 | 2 | 0.512 | 0.567 | ○ |
| Example 9 | — | 50 | — | — | 123 | 100 | — | 0.435 | 0.585 | ○ |
| Example 10 | — | 55 | — | — | 123 | 100 | — | 0.455 | 0.576 | ○ |
| Example 11 | — | 60 | — | — | 123 | 100 | — | 0.474 | 0.574 | ○ |
| Example 12 | — | 65 | — | — | 123 | 100 | — | 0.502 | 0.567 | ○ |
| Example 13 | 50 | — | — | — | 112 | 100 | 2 | 0.500 | 0.571 | ○ |
| Comparative Example 1 | 45 | — | — | — | 112 | 100 | — | 0.419 | 0.555 | x |
| Comparative Example 2 | — | 45 | — | — | 123 | 100 | — | 0.413 | 0.573 | x |
| Comparative Example 3 | — | — | 55 | — | 83 | 72 | — | 0.406 | 0.603 | x |
| Comparative Example 4 | — | — | 60 | — | 83 | 72 | — | 0.427 | 0.606 | x |
| Comparative Example 5 | — | — | 65 | — | 83 | 72 | — | 0.456 | 0.620 | x |
| Comparative Example 6 | — | — | 70 | — | 83 | 72 | — | 0.464 | 0.610 | x |
| Comparative Example 7 | — | — | 75 | — | 83 | 72 | — | 0.480 | 0.609 | x |
| Comparative Example 8 | — | — | 50 | — | 83 | 72 | 3 | 0.377 | 0.583 | x |
| Comparative Example 9 | — | — | — | 50 | 74 | 90 | — | 0.396 | 0.580 | x |

*11 CB1: CTAB adsorption specific surface area = 112 m²/g, 24M4DBP absorption amount = 100 mL/100 g, Product name "Seast 6", made by Tokai Carbon Co., Ltd.
*12 CB2: CTAB adsorption specific surface area = 123 m²/g, 24M4DBP absorption amount = 100 mL/100 g, Product name "Asahi #78", made by Asahi Carbon Co., Ltd.
*13 CB3: CTAB adsorption specific surface area = 83 m²/g, 24M4DBP absorption amount = 72 mL/100 g, Product name "Asahi #70L", made by Asahi Carbon Co., Ltd.
*14 CB4: CTAB adsorption specific surface area = 74 m²/g, 24M4DBP absorption amount = 90 mL/100 g, Product name "Asahi #70K", made by Asahi Carbon Co., Ltd.

The results provided in Table 2 and FIG. 7 indicate that when the rubber component contains 80% by mass or more of acrylonitrile-butadiene rubber with an acrylonitrile unit content of more than 45% by mass, the responsiveness of changes in electrical resistance to strain becomes better in the range where the loss tangent (tan δ) at 1% strain is 0.6 or less and the hysteresis loss (Wd/Ws) at 70% elongation is 0.43 or more, and thus the occurrence of cracks can be detected.

INDUSTRIAL APPLICABILITY

The conductive rubber composition for sensing of this disclosure has a good responsiveness of changes in electrical resistance to strain, and thus can be used, as an example, to detect the occurrence of cracks from the changes in electrical resistance, as applied to the rubber tubes in rubber actuators.

REFERENCE SIGNS LIST

10: Rubber actuator
20: Connecting part
30: Resistance measurement device
100: Actuator body
110: Rubber tube
111: Inner layer rubber
112: Outer layer rubber
120: Sleeve
200: Sealing mechanism
210: Sealing member
211: Trunk part
212: Brim part
213: Concavo-convex part
214: Small diameter part
215: Passage hole
220: Locking ring
230: Caulking member
231: Indentation
300: Sealing member
400, 500: Fitting
410, 510: Passage hole
$D_{AX}$: Axial direction
$D_R$: Radial direction

The invention claimed is:

1. A conductive rubber composition for sensing, containing a rubber component and carbon black,
   wherein the rubber component contains 80% by mass or more of acrylonitrile-butadiene rubber with an acrylonitrile unit content of more than 45% by mass,
   the carbon black has a cetyltrimethylammonium bromide (CTAB) adsorption specific surface area of 110 m²/g or more,
   a loss tangent (tan δ) at 1% strain is 0.6 or less, and
   a hysteresis loss (Wd/Ws) at 70% elongation is 0.43 or more.

2. The conductive rubber composition for sensing according to claim 1, wherein the loss tangent (tan δ) at 1% strain is 0.58 or less.

3. The conductive rubber composition for sensing according to claim 2, wherein the hysteresis loss (Wd/Ws) at 70% elongation is 0.45 or more.

4. The conductive rubber composition for sensing according to claim 2, wherein the rubber component consists solely of the acrylonitrile-butadiene rubber with an acrylonitrile unit content of more than 45% by mass.

5. The conductive rubber composition for sensing according to claim 2, wherein the carbon black content is 40 parts by mass or more and 55 parts by mass or less per 100 parts by mass of the rubber component.

6. The conductive rubber composition for sensing according to claim 2, further containing a carbon nanotube,
   wherein the carbon nanotube content is 1 part by mass or more and 5 parts by mass or less per 100 parts by mass of the rubber component.

7. The conductive rubber composition for sensing according to claim 1, wherein the hysteresis loss (Wd/Ws) at 70% elongation is 0.45 or more.

8. The conductive rubber composition for sensing according to claim 7, wherein the rubber component consists solely of the acrylonitrile-butadiene rubber with an acrylonitrile unit content of more than 45% by mass.

9. The conductive rubber composition for sensing according to claim 7, wherein the carbon black content is 40 parts by mass or more and 55 parts by mass or less per 100 parts by mass of the rubber component.

10. The conductive rubber composition for sensing according to claim 7, further containing a carbon nanotube, wherein the carbon nanotube content is 1 part by mass or more and 5 parts by mass or less per 100 parts by mass of the rubber component.

11. The conductive rubber composition for sensing according to claim 1, wherein the rubber component consists solely of the acrylonitrile-butadiene rubber with an acrylonitrile unit content of more than 45% by mass.

12. The conductive rubber composition for sensing according to claim 11, wherein the carbon black content is 40 parts by mass or more and 55 parts by mass or less per 100 parts by mass of the rubber component.

13. The conductive rubber composition for sensing according to claim 11, further containing a carbon nanotube, wherein the carbon nanotube content is 1 part by mass or more and 5 parts by mass or less per 100 parts by mass of the rubber component.

14. The conductive rubber composition for sensing according to claim 1, wherein the carbon black content is 40 parts by mass or more and 55 parts by mass or less per 100 parts by mass of the rubber component.

15. The conductive rubber composition for sensing according to claim 1, further containing a carbon nanotube, wherein the carbon nanotube content is 1 part by mass or more and 5 parts by mass or less per 100 parts by mass of the rubber component.

* * * * *